United States Patent
Descubes et al.

(10) Patent No.: US 10,176,648 B2
(45) Date of Patent: Jan. 8, 2019

(54) METHOD AND DEVICE FOR NOTIFYING AN AUTHORIZATION TO COMPLETELY SHUT DOWN AN AIRCRAFT GAS TURBINE ENGINE

(71) Applicant: SAFRAN HELICOPTER ENGINES, Bordes (FR)

(72) Inventors: Olivier Pierre Descubes, Nay (FR); Jean-Michel Pierre Claude Py, Pardies Pietat (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/517,713

(22) PCT Filed: Oct. 8, 2015

(86) PCT No.: PCT/FR2015/052703
§ 371 (c)(1),
(2) Date: Apr. 7, 2017

(87) PCT Pub. No.: WO2016/055738
PCT Pub. Date: Apr. 14, 2016

(65) Prior Publication Data
US 2017/0301157 A1    Oct. 19, 2017

(30) Foreign Application Priority Data
Oct. 10, 2014 (FR) ...................................... 14 59756

(51) Int. Cl.
*B64D 43/00* (2006.01)
*G07C 5/00* (2006.01)
(Continued)

(52) U.S. Cl.
CPC ........... *G07C 5/0816* (2013.01); *B64D 43/00* (2013.01); *F01D 21/00* (2013.01); *F02C 9/00* (2013.01);
(Continued)

(58) Field of Classification Search
CPC ........ G07C 5/00; G07C 5/0816; B64D 43/00; F02C 9/00; F02C 9/28; G08B 5/00; G08B 5/22
See application file for complete search history.

(56) References Cited

U.S. PATENT DOCUMENTS 4,452,037 A    6/1984    Waddington et al.
6,125,624 A    10/2000   Prociw
(Continued)

FOREIGN PATENT DOCUMENTS

EP    0093486 A1    11/1983
EP    1605148 A1    12/2005
(Continued)

OTHER PUBLICATIONS

International Search Report dated Jan. 5, 2016, in PCT/FR2015/052703, filed Oct. 8, 2015.

*Primary Examiner* — Yonel Beaulieu
(74) *Attorney, Agent, or Firm* — Oblon, McClelland, Maier & Neustadt, L.L.P.

(57) ABSTRACT

A method of notifying an authorization to shut down completely an aircraft gas turbine engine, the method being applied after detecting that the engine has passed to an idling speed, and including a) an evaluation step of using a value of a first operating parameter of the engine to evaluate a value for a second parameter T45MG wherein a thermal behavior of a part of the engine that might be subjected to coking; b) a comparison step (E30) of comparing the value of the second parameter T45MG with a predefined threshold
(Continued)

value T45thresh corresponding to a value of the second parameter that does not lead to coking of the part; and c) a notification step of notifying authorization to shut down completely the engine if the value of the second parameter T45MG is lower than the value of the predefined threshold T45thresh, else reiterating steps a) to c).

7 Claims, 3 Drawing Sheets

(51) Int. Cl.
| | | |
|---|---|---|
| *F01D 21/00* | (2006.01) | |
| *F02C 9/00* | (2006.01) | |
| *F02C 9/28* | (2006.01) | |
| *G08G 5/00* | (2006.01) | |
| *G07C 5/08* | (2006.01) | |
| *G08B 5/22* | (2006.01) | |
| *B64D 45/00* | (2006.01) | |
| *F02D 41/04* | (2006.01) | |

(52) U.S. Cl.
CPC ............... *F02C 9/28* (2013.01); *G08B 5/22* (2013.01); *B64D 45/00* (2013.01); *F02D 41/042* (2013.01); *F05B 2270/303* (2013.01); *F05D 2260/80* (2013.01); *F05D 2270/303* (2013.01)

(56) References Cited

U.S. PATENT DOCUMENTS

| | | | |
|---|---|---|---|
| 6,244,034 B1* | 6/2001 | Taylor | F02C 6/16 60/39.094 |
| 6,804,946 B2* | 10/2004 | Willis | F01D 21/06 60/39.094 |
| 6,886,324 B1 | 5/2005 | Handshuh et al. | |
| 7,225,626 B2* | 6/2007 | Robinson | F01D 25/125 184/6.11 |
| 7,793,505 B2* | 9/2010 | Dooley | F01D 19/00 184/6.11 |
| 9,121,309 B2* | 9/2015 | Geiger | F01D 21/06 |
| 9,472,026 B2* | 10/2016 | Gerez | F01D 19/02 |
| 9,915,201 B2* | 3/2018 | Karam | F02C 7/045 |
| 2006/0016190 A1* | 1/2006 | Howell | F01D 25/12 60/752 |
| 2009/0071119 A1 | 3/2009 | Kervistin et al. | |
| 2012/0316748 A1 | 12/2012 | Jegu et al. | |

FOREIGN PATENT DOCUMENTS

| | | |
|---|---|---|
| EP | 2532840 A1 | 12/2012 |
| FR | 2953562 | 6/2011 |
| RU | 2008118671 A | 11/2009 |
| WO | 99/54610 A1 | 10/1999 |

* cited by examiner

METHOD AND DEVICE FOR NOTIFYING AN AUTHORIZATION TO COMPLETELY SHUT DOWN AN AIRCRAFT GAS TURBINE ENGINE

BACKGROUND OF THE INVENTION

The present invention relates to the general field of aircraft gas turbine engines for which it is necessary for the engine to idle for a certain duration on the ground before causing the engine to be shut down completely.

In the field of aviation, it is common practice in utilization manuals for aircraft pilots to indicate that the engine needs to run at an operating speed known as "idling" for a certain duration before causing the engine to be shut down completely. This duration is referred to as "stabilizing the engine" and it is associated mainly with the risk of the oil or fuel in the engine coking on hot portions of the engine (e.g. on injectors for injecting fuel into the combustion chamber of the engine). In order to avoid excessive coking of such hot portions of the engine, it is thus recommended to leave the engine operating at an idling speed for a certain duration before shutting it down completely.

The duration of this engine stabilization stage is generally predefined as a function of the type of engine and it typically lies in the range 30 seconds to 2 minutes.

However, imposing a fixed stabilization duration presents numerous drawbacks. Specifically, if it is desired to cover the worst possible thermal situation for the engine, then the stabilization duration will necessarily be long, which imposes a waiting time that is penalizing for the crew of the aircraft before they can shut the engine down completely. In contrast, if it is desired to minimize this constraint for the crew, the stabilization duration should be as short as possible, which can expose the engine to significant coking phenomena that, in the long run, lead to significant maintenance costs and times.

There therefore exists a need for a method of determining a stabilization duration at idling speed for an aircraft gas turbine engine prior to complete shutdown that does not present the above-mentioned drawbacks that are associated with determining a fixed stabilization duration.

OBJECT AND SUMMARY OF THE INVENTION

The present invention satisfies this need in particular by providing a method of notifying an authorization to shut down completely an aircraft gas turbine engine, the method being applied after detecting that the engine has passed to an idling speed, and comprising:

a) an evaluation step of using a value of a first operating parameter of the engine to evaluate a value for a second parameter characterizing a thermal behavior of a part of the engine that might be subjected to coking, this evaluation being performed by means of a thermal behavior model for said part;

b) a comparison step of comparing the value of the second parameter with a predefined threshold value corresponding to a value of the second parameter that does not lead to coking of said part; and c) a notification step of notifying authorization to shut down the engine completely if the value of the second parameter is lower than the value of the predefined threshold;

else reiterating steps a) to c).

Correspondingly, the invention also provides a device for notifying authorization to shut down completely an aircraft gas turbine engine, the device comprising:

evaluation means for using a value of a first operating parameter of the engine to evaluate a value for a second parameter characterizing a thermal behavior of a part of the engine that might be subjected to coking, this evaluation being performed by means of a thermal behavior model for said part;

comparator means for comparing the value of the second parameter with a predefined threshold value corresponding to a value of the second parameter that does not lead to coking of said part; and notification means for notifying authorization to shut down the engine completely.

The invention thus provides a sound mechanism for adapting the stabilization duration of the engine as a function of the actual use of the engine. By using a model of the thermal behavior for a part of the engine that might be subjected to coking, and merely by having knowledge of an operating parameter of the engine, this mechanism (which may be integrated directly in the electronic computer of the engine) thus makes it possible in effective manner to determine the necessary duration that the pilot needs to apply prior to shutting down the engine completely. This mechanism is simple to perform (it does not require special tools or measurement instruments, since the operating parameter that it uses is a parameter that is already monitored for other monitoring functions of the engine), and it makes it possible to calculate accurately the duration needed to avoid any excessive coking of the hot portions of the engine.

By avoiding any risk of excessive coking, the mechanism of the invention thus makes it possible to reduce the costs and the time required for maintaining the engine. Furthermore, the mechanism makes it possible to optimize piloting and flying procedures by making this engine stabilization stage as simple as possible for the pilot. Finally, with such a mechanism, it is possible to anticipate maintenance operations if stabilization durations on the ground have not been complied with, and to keep account of the number of stabilization stages that have been of long duration.

Advantageously, a value for the second parameter may be evaluated by calculating a mean value of the first operating parameter of the engine over a moving time window.

Also advantageously, the method may further comprise triggering a timer on detecting that the engine has passed to an idling speed, and notifying authorization to shut down the engine completely when the time that has elapsed since triggering the timer exceeds a predetermined threshold duration.

Typically, the predetermined threshold duration is selected to be a duration for which it is known by experience that it covers the worst possible thermal situation for the engine. For example, this threshold duration may be equal to 2 minutes. Thus, this additional step makes it possible to shorten the stabilization duration if the mean value of the operating parameter of the engine takes time to come down below the predefined threshold value.

The first parameter may be selected from the following operating parameters of the engine: a temperature measured in a flow channel for a gas stream between two turbine stages; an ambient temperature measured at the inlet of the engine; an oil temperature of the engine; a fuel temperature of the engine; and an operating speed of the engine.

In addition, the notification authorizing complete shutdown of the engine may consist in a visual display informing the pilot of one or more of the following items: authorization to shut down the engine completely; complete shutdown of the engine without risk of coking; displaying a previously estimated waiting duration necessary prior to authorizing complete shutdown of the engine.

The passage of the engine to an idling speed may be detected as a result of the pilot of the aircraft actuating a switch or as a result of detecting an operating speed of the engine that corresponds to an idling speed, or a related thermal state.

In a particular embodiment, the various steps of the method are determined by computer program instructions.

Consequently, the invention also provides a computer program on a data medium, the program being suitable for being performed in a notification device or more generally in a computer, the program including instructions adapted to performing steps of a method as described above.

The program may use any programming language and be in the form of source code, object code, or code intermediate between source code and object code, such as in a partially compiled form, or in any other desirable form.

The invention also provides a computer readable data medium including computer program instructions as mentioned above.

The data medium may be any entity or device capable of storing the program. By way of example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal that can be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides an aircraft gas turbine engine including a device as defined above.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
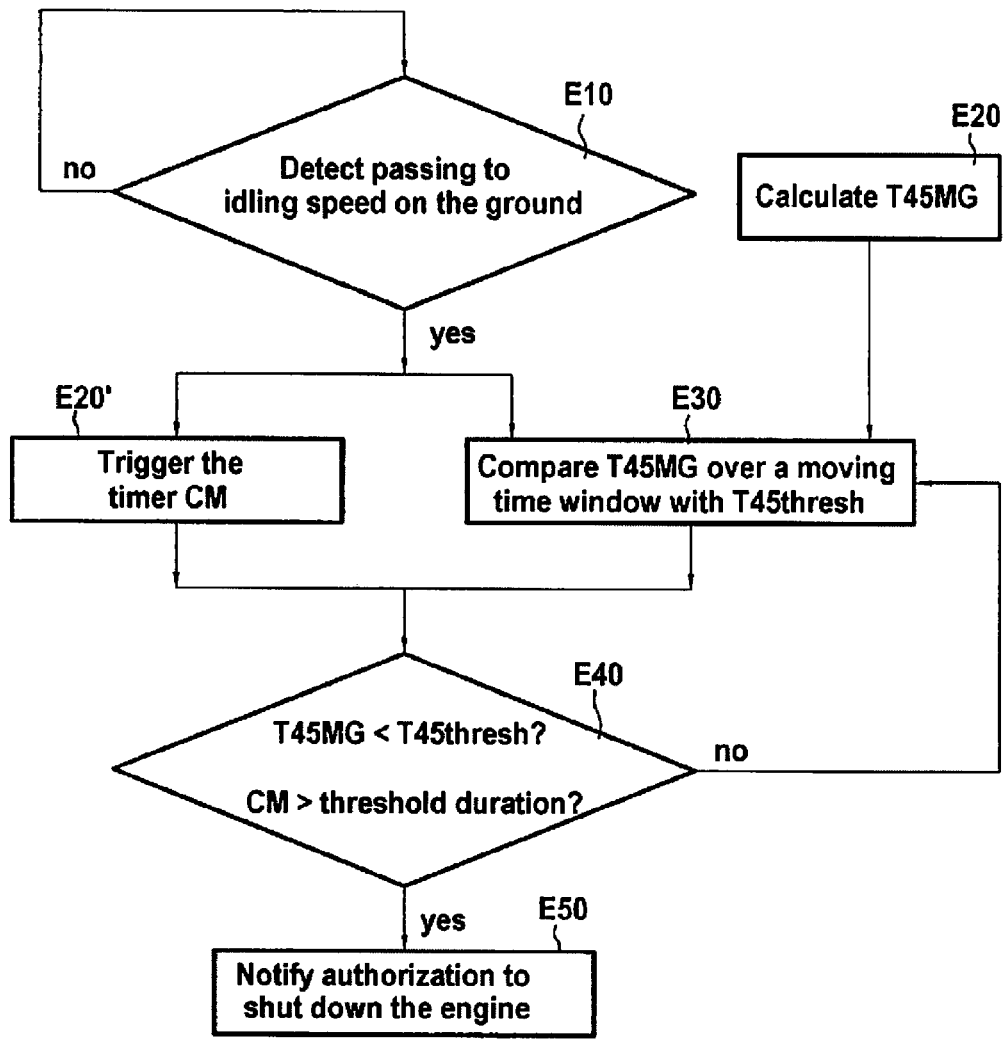
FIG. 1 is a flow chart showing the main steps of a method of the invention for determining a duration for stabilizing idling.

FIG. 1 is a flow chart showing the main steps of a method of the invention for notifying an authorization to shut down completely an aircraft gas turbine engine.

Authorization to shut down completely an aircraft gas turbine engine, e.g. a commercial airplane turbojet, takes place after a flight and following stages of landing an aircraft and taxiing on the ground. The purpose of such authorization to shut down completely is to ensure that the engine operates for a certain duration while idling before the engine is shut down completely in order to avoid any risk of oil or fuel coking hot portions of the engine, such as for example injectors for injector fuel into the combustion chamber.

The purpose of the method of the invention is to define a duration for idling operation of the engine before it is shut down completely, which duration varies as a function of certain operating parameters of the engine characterizing the thermal behavior of a part of the engine that might be subjected to coking.

To this end, and as shown in FIG. 1, the method of the invention comprises a first step E10 that consists in detecting whether the engine has passed to idling speed.

This passage to idling speed can be detected as a result of the aircraft pilot actuating a switch, or as a result of detecting a speed of operation of the engine that corresponds to an idling speed, where such detection can be performed on the basis of one of the parameters seen by the computer, such as an indication of the collective pitch, of the speed of the gas generator, of the outlet temperature of the turbine, etc.

Once it has been detected that the engine is operating at idling speed, the method of the invention makes provision during a step E20 to use a value of a first operating parameter of the engine to evaluate a value for a second parameter that characterizes the thermal behavior of a part of the engine that might be subjected to coking.

The value of the first parameter can be calculated continuously or as a result of an event indicating that the engine is going to be shut down.

The first operating parameter of the engine used during this evaluation step E20 typically corresponds to a temperature measured in the engine in the vicinity of the part that might be subjected to coking.

By way of example, this first operating parameter may be selected from the following parameters: a temperature measured in a flow channel for a gas stream between two turbine stages (referred to below as T45); ambient temperature measured at the inlet of the engine; an oil temperature of the engine; a fuel temperature of the engine; an operating speed of the engine; etc.

These examples have the advantage of being parameters that are already monitored during a mission of an aircraft. Typically, the measured values for these parameters are delivered continuously during the mission to the computer of the engine regulator device in order to be analyzed therein.

From a model of the thermal behavior of the part for which the first parameter is measured, a value is then evaluated for a second parameter characterizing a thermal behavior of that part.

This model of thermal behavior is a function (also known as integral operator) that makes it possible on the basis of an input value for an operating parameter (such as a temperature measured in the engine in the vicinity of the part), to model the thermal behavior of the part.

In an applied implementation of the invention in which the first operating parameter is the temperature T45 measured in a flow channel for a gas stream between two turbine stages of the engine, the thermal behavior model may be calculating the mean T45MG of the values for the temperature T45 as measured over a moving time window of predetermined duration (e.g. of the order of a few minutes).

The evaluation step E20 may be performed throughout the mission, from starting to complete shut down of the engine. It may be performed by calculation software means embedded in the engine computer, thus making it possible to obtain continuously a value for the second parameter characterizing a thermal behavior of the part that might be subjected to coking (in the example shown: T45MG).

In parallel with this evaluation step E20, the method may make provision in a step E20' to trigger a timer CM from the moment at which it is detected that the engine has passed to an idling speed.

The following step E30 consists in comparing the value of the second parameter as obtained in step E20 (in this example the mean T45MG) with a predefined threshold value (in this example T45thresh). This comparison step is performed by calculation software embedded in the engine computer.

The threshold value T45thresh corresponds to a value of the second parameter for which it has previously been established that coking of the part will not take place.

This threshold value T45thresh is established beforehand from a multi-entry table (e.g. with the temperature and the pressure at the inlet of the engine, the temperature of the oil, the temperature of the fuel, etc.), and as a function of measurements of the engine at the time it is detected that the engine has passed to an idling speed. Such a table is typically prepared by experience feedback on the basis of data obtained in earlier missions for engines of the same family as the engine in question.

At the end of this comparison step E30, if it is established during a step E40 that the value of the second parameter T45MG is less than the predefined threshold value T45thresh, the engine computer notifies the pilot of authorization to shut down the engine completely (step E50).

In contrast, if the value of the second parameter T45MG is higher than the predefined threshold value T45thresh, then steps E30 and E40 are repeated. In other words, if the value of the second parameter T45MG is higher than the predefined threshold value T45thresh, the engine computer performs a new comparison between the mean T45MG as calculated from new values of the temperature T45 measured over the moving time window and the predefined threshold value (T45thresh), which value may possibly vary as a function of time.

This process of evaluating the mean T45MG and comparing it with the predefined threshold value T45thresh is reiterated until the value of the mean T45MG becomes lower than the predefined threshold value T45thresh, whereupon the computer notifies the pilot of authorization to shut down the engine completely.

Furthermore, when a timer CM is started during the step E20', the method makes provision during the step E40 to verify whether the time that has elapsed since the timer was started exceeds a predetermined threshold duration (typically of the order of 2 minutes), whereupon the computer of the engine notifies the pilot of authorization to shut down the engine completely (step E50). In contrast, if the elapsed time is shorter than the predetermined threshold duration, then steps E20 to E40 are repeated, as described above.

Figure 3:
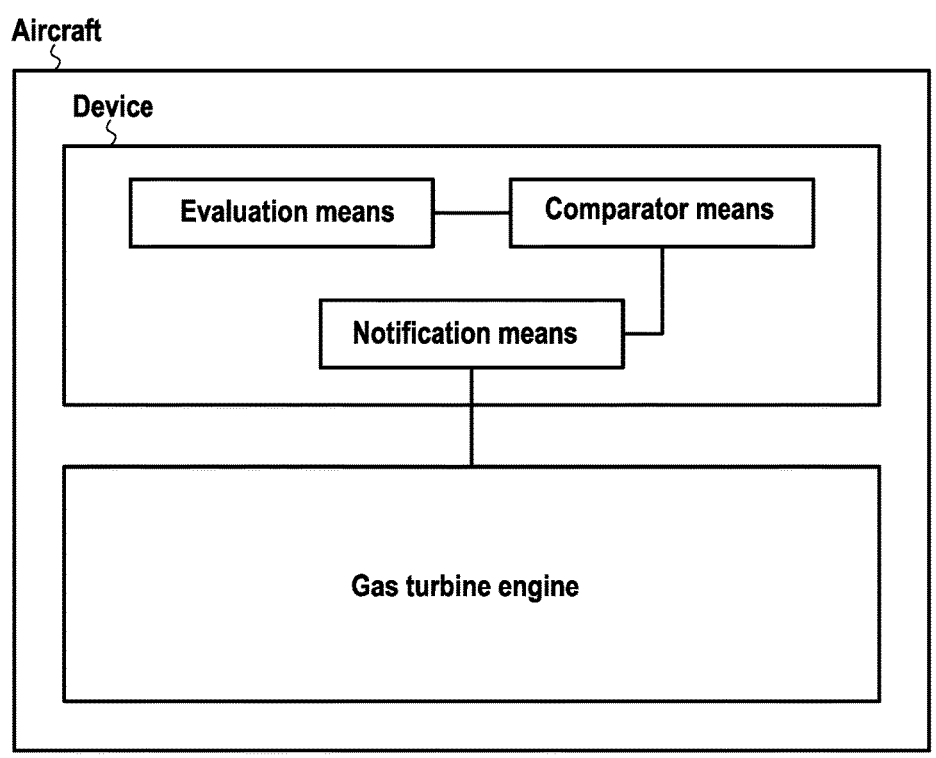
FIG. 3 is an embodiment of a visual display of the invention.

The step E50 of notifying the pilot of an authorization to shut down the engine completely may take various forms. In particular, it may consist in a visual display (shown in FIG. 3) informing the pilot of one or more of the following items: authorization to shut down the engine completely; complete engine shutdown possible without risk of coking (the risk is mentioned so long as the stabilization prior to shutdown is not sufficient); displaying a previously estimated waiting time needed before authorization to shut down the engine completely.

Figure 2:
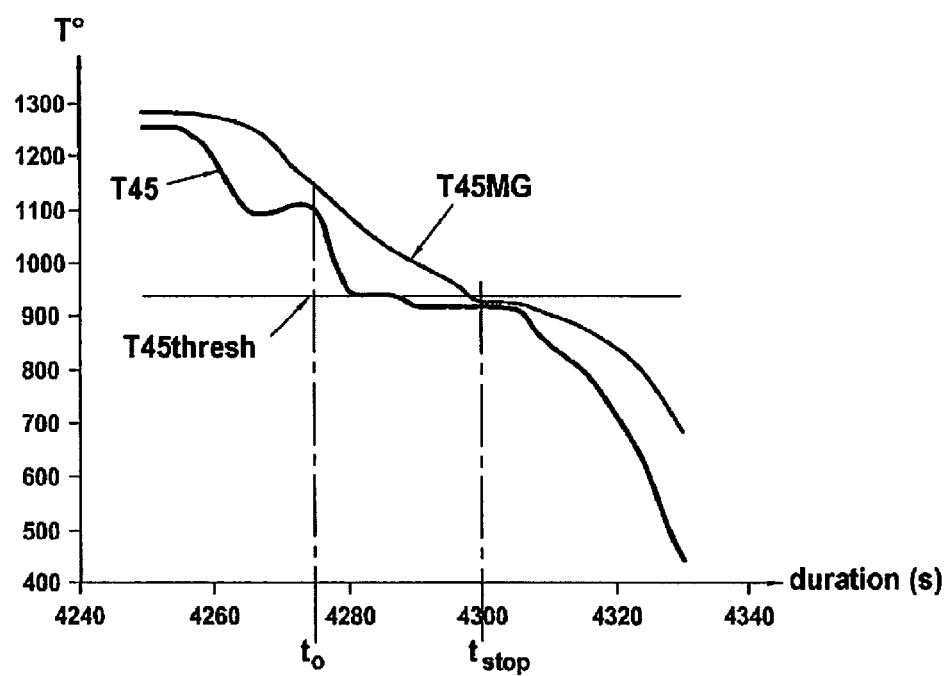
FIG. 2 is a graph showing an implementation of the method of the invention.

With reference to FIG. 2, there follows a description of an implementation of the above-described steps E20 and E30 of the method.

In this example, the first operating parameter of the engine is the temperature T45 measured in a flow channel for a gas stream between two turbine stages of the engine, and the second parameter characterizing a thermal behavior of a part of the engine that might be subjected to coking is a mean T45MG of the values of the temperature T45 as measured in a moving time window of predetermined duration.

FIG. 2 plots temperature curves as a function of time. In this example, there can be seen the curve for the measured temperature T45 plotted as a continuous line. On the basis of this temperature T45, the engine computer calculates a mean value T45MG of the temperature over a moving window, corresponding in this example to the five most recent measurements taken of the temperature. The curve for this mean value T45MG is also plotted in FIG. 2 (this mean value T45MG is calculated continuously from starting to shutting down the engine).

The mean value T45MG is then compared with a threshold temperature T45thresh, which in this example is constant over the entire duration of the stage of shutting down the engine and is equal to about 940° C. As soon as the mean value T45MG becomes lower than this threshold temperature T45thresh, in this example at a time $t_{stop}$ equal to about 4300 seconds, the engine computer sends a notification to the pilot authorizing complete shutdown of the engine. Thus, the engine stabilization duration prior to the engine being shut down is given by $t_{stop}-t_o$, which is about 25 seconds, $t_o$ corresponding to the moment when the passage to idling speed has been detected.

The invention claimed is:

1. A method of notifying an authorization to shut down completely an aircraft gas turbine engine, the method being applied after detecting that the engine has passed to an idling speed, and comprising:
   triggering a timer on detecting that the engine has passed to the idling speed;
   a) an evaluation step of using a value of a first operating parameter of the engine to evaluate a value for a second parameter wherein a thermal behavior of a part of the engine that might be subjected to coking, said evaluation being performed by means of a thermal behavior model for said part;
   b) a comparison step of comparing the value of the second parameter with a predefined threshold value corresponding to a value of the second parameter that does not lead to coking of said part; and
   c) a notification step of notifying authorization to shut down the engine completely if the value of the second parameter is lower than the value of the predefined threshold;
   else reiterating steps a) to c); and
   notifying authorization to shut down the engine completely when the time that has elapsed since triggering the timer exceeds a predetermined threshold duration.

2. The method according to claim 1, wherein a value for the second parameter is evaluated by calculating a mean value of the first operating parameter of the engine over a moving time window.

3. The method according to claim 1, wherein the first parameter is selected from the following operating parameters of the engine: a temperature measured in a flow channel for a gas stream between two turbine stages; an ambient temperature measured at the inlet of the engine; an oil temperature of the engine; a fuel temperature of the engine; and an operating speed of the engine.

4. The method according to claim 1, wherein the notification authorizing complete shutdown of the engine comprising a visual display informing the pilot of one or more of the following items: authorization to shut down the engine completely; complete shutdown of the engine without risk of coking; displaying a previously estimated waiting duration necessary prior to authorizing complete shutdown of the engine.

5. The method according to claim 1, wherein the passage of the engine to an idling speed is detected as a result of the pilot of the aircraft actuating a switch or as a result of detecting an operating speed of the engine that corresponds to an idling speed.

6. A computer readable data medium storing a computer program including instructions for executing steps of the method of notifying an authorization to shut down completely an aircraft gas turbine engine, the method being applied after detecting that the engine has passed to an idling speed, and comprising:
  triggering a timer on detecting that the engine has passed to the idling speed;
  a) an evaluation step of using a value of a first operating parameter of the engine to evaluate a value for a second parameter wherein a thermal behavior of a part of the engine that might be subjected to coking, this evaluation being performed by means of a thermal behavior model for said part;
  b) a comparison step of comparing the value of the second parameter with a predefined threshold value corresponding to a value of the second parameter that does not lead to coking of said part; and
  c) a notification step of notifying authorization to shut down the engine completely if the value of the second parameter is lower than the value of the predefined threshold;
  else reiterating steps a) to c); and
  notifying authorization to shut down the engine completely when the time that has elapsed since triggering the timer exceeds a predetermined threshold duration.

7. An aircraft gas turbine engine including a device for notifying authorization to shut down completely an aircraft gas turbine engine, the device comprising:
  circuitry configured to:
    trigger a timer on detecting that the engine has passed to an idling speed;
    a) use a value of a first operating parameter of the engine to evaluate a value for a second parameter characterizing a thermal behavior of a part of the engine that might be subjected to coking, this evaluation being performed by means of a thermal behavior model for said part;
    b) compare the value of the second parameter with a predefined threshold value corresponding to a value of the second parameter that does not lead to coking of said part; and
    c) notify authorization to shut down the engine completely if the value of the second parameter is lower than the value of the predefined threshold;
  else reiterate steps a) to c); and
  notify authorization to shut down the engine completely when the time that has elapsed since triggering the timer exceeds a predetermined threshold duration.

* * * * *